United States Patent
Mochizuki et al.

[11] Patent Number: 5,966,255
[45] Date of Patent: Oct. 12, 1999

[54] ESCAPE DEVICE FOR AN INNER MIRROR

[75] Inventors: Toshihiro Mochizuki, Fujieda; Yoshitake Nakazawa, Shimizu; Satoshi Iwama, Fujieda; Hiroshi Teramoto, Yaizu; Jun Hanai, Shizuoka, all of Japan

[73] Assignee: Murakami Corporation, Shizuoka, Japan

[21] Appl. No.: 09/114,601

[22] Filed: Jul. 13, 1998

[30] Foreign Application Priority Data

Dec. 16, 1997 [JP] Japan ................................ 9-363441

[51] Int. Cl.⁶ .............................. G02B 7/182; B60R 1/04
[52] U.S. Cl. .......................... 359/841; 359/872; 248/478; 248/479; 248/549; 248/900
[58] Field of Search ...................... 359/841, 872; 248/477, 478, 479, 549, 900

[56] References Cited

U.S. PATENT DOCUMENTS

| | | | |
|---|---|---|---|
| 4,668,059 | 5/1987 | Ohyama | 359/872 |
| 4,775,218 | 10/1988 | Wood et al. | 359/872 |
| 4,934,802 | 6/1990 | Fluhartly et al. | 359/872 |
| 5,182,675 | 1/1993 | Arbisi et al. | 359/841 |
| 5,210,652 | 5/1993 | Perkinson | 359/841 |
| 5,517,337 | 5/1996 | Dupin et al. | 359/841 |

*Primary Examiner*—Ricky D. Shafer
*Attorney, Agent, or Firm*—Hedman, Gibson & Costigan

[57] ABSTRACT

An escape device for an inner mirror includes a stay base mounted on a ceiling of a cabin of a vehicle a stay suspended from and supported by the stay base and connected to the stay base pivotably about an axis extending horizontally in the direction of width of the vehicle, the stay having a mirror body attached to a lower portion thereof, and a stop mechanism provided between the stay base and the stay for stopping the pivotal movement of the stay about the axis relative to the stay base and thereby holding the stay in a suspended state in a normal mode of use and, when an external force exceeding a predetermined value is applied to the stay in the forward direction of the vehicle, disengaging the stay by the external force to allow the pivotal movement of the stay about the axis.

4 Claims, 3 Drawing Sheets

ESCAPE DEVICE FOR AN INNER MIRROR

BACKGROUND OF THE INVENTION

This invention relates to an escape device for an inner mirror which, when a passenger of a vehicle such as an automobile collides against an inner mirror installed in a cabin of the vehicle, mitigates a shock produced by the collision and, more particularly, to such device having an increased safety and being capable of easily restoring to a normal state.

A prior art inner mirror is mounted to a vehicle in such a manner that, when an external force is applied thereto by, for example, collision of a passenger against it due to collision of the vehicle, the inner mirror falls off to mitigate the shock.

Since the inner mirror falls off when an external force is applied, it must be remounted to the vehicle for restoring it to a normal state and this restoration requires a troublesome work. Further, when the inner mirror has fallen off, a spring for mounting the inner mirror to the vehicle sometimes receives a plastic deformation and cannot be used again. Furthermore, when the inner mirror has fallen off, a passenger sometimes is injured by a component part such as a spring or screw which is left on the side of the vehicle.

It is therefore an object of the invention to overcome the above problem of the prior art and provide an inner mirror having an increased safety and being capable of easily restoring to a normal state.

SUMMARY OF THE INVENTION

An escape device for an inner mirror according to the invention comprises a stay base mounted on a ceiling of a cabin of a vehicle, a stay suspended from and supported by the stay base and connected to the stay base pivotably about an axis extending horizontally in the direction of width of the vehicle, said stay having a mirror body attached to a lower end portion thereof, a stop mechanism provided between the stay base and the stay for stopping the pivotal movement of the stay about the axis relative to the stay base and thereby holding the stay in a suspended state in a normal mode of use and, when an external force exceeding a predetermined value is applied to the stay in forward direction of the vehicle, disengaging the stay by the external force to allow the pivotal movement of the stay about the axis.

According to the invention, when a passenger of a vehicle collides against an inner mirror due to collision of the vehicle or other cause, the stay moves upwardly in a pivotal movement about its axis located in the upper portion thereof and thereby mitigates a shock. Since the stay does not fall off from the ceiling, safety is improved and restoration of the inner mirror is easy.

The stop mechanism may comprise, for example, a fitting structure including projections and corresponding depressions provided in opposite portions of the stay base and the stay which move relative to each other by the pivotal movement of the stay about the axis, and a spring provided between the stay base and the stay for energizing the stay base and the stay to hold a fitting state of the fitting structure, the pivotal movement of the stay about the axis being stopped and the stay being held in a suspended state in a normal mode of use by holding of the fitting state of the fitting structure and, when an external force exceeding a predetermined value is applied to the stay in forward direction of the vehicle, the projections being disengaged from the depressions by the external force against the force of the spring to allow the pivotal movement of stay about the axis and thereby allow the external force to escape.

For connecting the stay to the stay base, the connnecting structure may be arranged in such a manner that one of the stay base or the stay has a shaft of a circular cross section and the other has an opening of a circular cross section and the shaft is inserted in the opening relatively rotatably and relatively slidably in axial direction, the fitting structure of the stop mechanism has the projections formed on one of abutting surfaces of the stay base and the stay which are formed about a base portion of the shaft and about an opening end portion of the opening and has the depressions formed on the other of the abutting surfaces, and the spring is a coil spring in which the shaft is inserted and which applies the energizing force between the stay base and the stay in the direction of the axis to press the abutting surfaces to each other and thereby hold the fitting state of the fitting structure.

The stop mechanism may be restored, by applying an external force in rearward direction of the vehicle, from the state in which the stop mechanism has disengaged the stay to allow the pivotal movement to the state in which the stop mechanism stops pivotal movement of the stay.

The escape device for an inner mirror according to the invention may further comprise a cover which is mounted on the stay base in a manner to cover the stay base from below, said cover having an opening in an end portion in the forward direction of the vehicle to allow the stay to project out of the opening of the cover and said opening of the cover having a shape which does not prevent escaping of the inner mirror by the pivoting movement of the stay.

Preferred embodiments of the invention will be described below with reference to the accompanying drawings.

BRIEF DESCRIPTION OF THE DRAWINGS

In the accompanying drawings.

DESCRIPTION OF PREFERRED EMBODIMENTS

Figure 2:
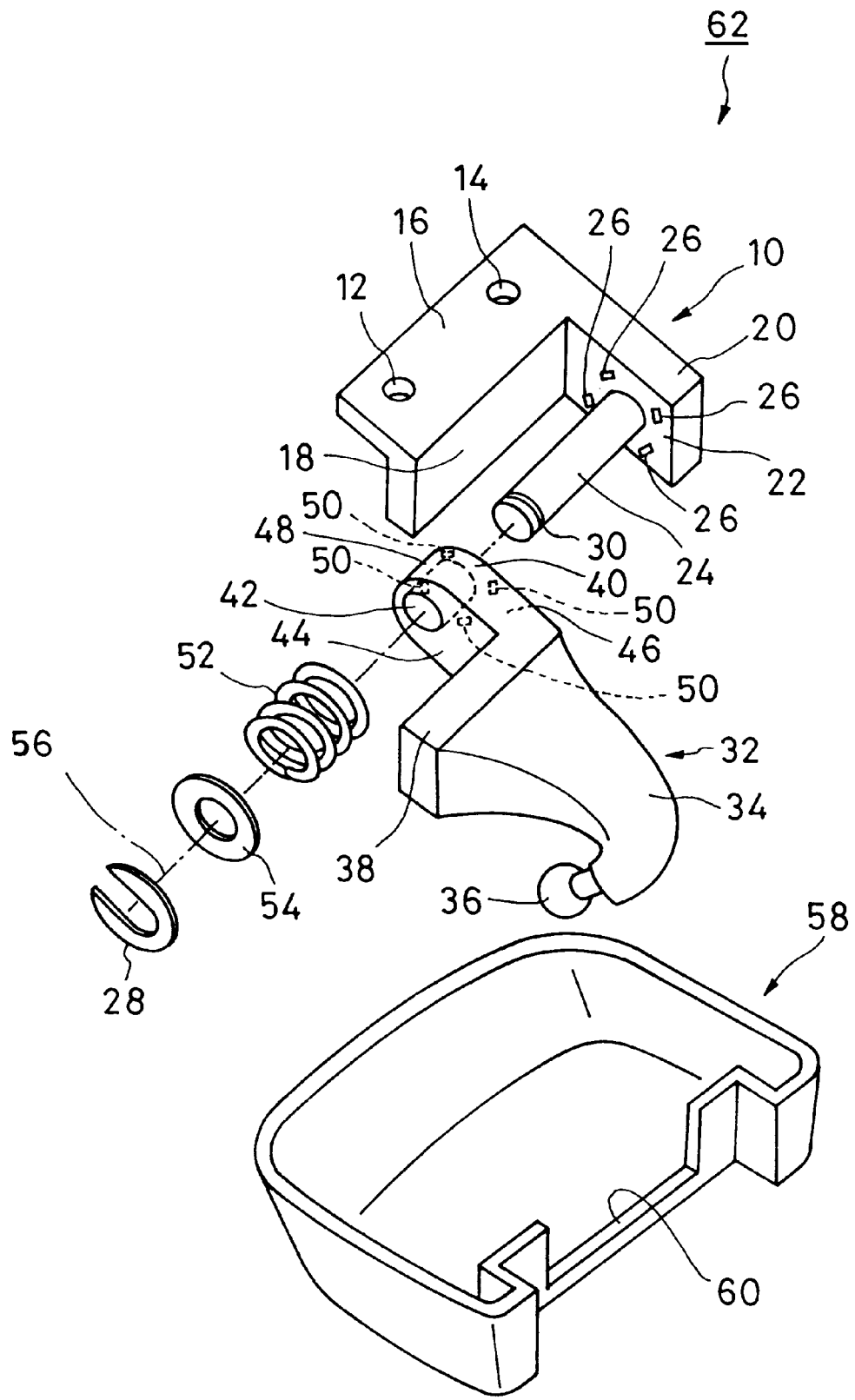
FIG. 2 is an exploded perspective view of the embodiment of the invention.

FIG. 2 is an exploded view of an inner mirror incorporating the present invention (a mirror body is not illustrated). A stay base 10 is a portion which is mounted on a ceiling of a cabin of an automobile and is formed as a block or an assembly made of any desired material, e.g., metal such as iron or aluminum or synthetic resin or ceramic. The stay base 10 has a ceiling mounting portion 16 for mounting the stay base 10 on the ceiling, a vertically extending portion 18 which extends vertically from an end portion of the ceiling mounting portion 16 in the forward direction of the vehicle, a base portion 20 which has a certain thickness and extends normally from one end portion of the vertically extending portion 18 in the forward direction of the vehicle and a shaft 24 in the shape of a round bar which is erected perpendicularly from a plane 22 of the base portion 20 (i.e., a vertical plane extending in the longitudinal direction of the vehicle) and extends in the direction of width of the vehicle in parallel to the vertically extending portion 18. These portions 16, 18, 20 and 24 are formed integrally. The ceiling mounting portion 16 is formed with openings 12 and 14 for receiving screws for mounting the stay base 10 to the ceiling. On the plane 22 of the base portion 20 are formed projections 26 surrounding the shaft 24 and disposed at a predetermined interval. The shaft 24 is formed in the outer periphery of the foremost end portion thereof with a groove 30 for inserting a plate 28 and thereby attaching the plate 28 to the shaft 24.

A stay 32 is formed as a block or an assembly made of any desired material, e.g., metal such as iron or aluminum or synthetic resin or ceramic. The stay 32 has a stay main body 34 which extends obliquely downwardly in the forward direction of the vehicle and, from the middle portion, extends obliquely downwardly in the rear direction of the vehicle, with its diameter being gradually reduced toward its foremost end, a spherical pivot 36 formed at the lower end of the stay main body 34 for mounting a mirror body (not shown) pivotably in all directions, and a connecting portion 40 for connecting the stay 32 to the stay base 10 which connecting portion is made of a vertical plate having a certain thickness which extends perpendicularly in the longitudinal direction of the vehicle from an end portion of a base portion 38 of the stay main body 34 opposite to the base portion 20 of the stay base 10. These portions 34, 36 and 40 are formed integrally. The connecting portion 40 is formed with a circular opening 42 having a certain diameter and extending perpendicularly to and through end surfaces 44 and 46 of the connecting portion 40. The inner diameter of the circular opening 42 is almost equal to (slightly larger than) the outer diameter of the shaft 24. An end surface 48 of the connecting portion 40 in the rearward direction of the vehicle is formed in the shape of an arc. On the side of the surface 46 of the connecting portion 40 opposite to the base portion 20 of the stay base 10 are formed depressions 50 surrounding the opening end of the circular opening 42 in which the projections 26 of the stay base 10 can be disengageably fitted.

The stay 32 is connected to the stay base 10 by inserting the shaft 24 into the circular opening 42. In this state, the stay 32 is pivotable about a pivot axis 56 passing the center of the shaft 24 and also is slidable along the axis 56. The shaft 24 is further inserted through a coil spring 52. By compressing the coil spring 52 and inserting the plate 28 in the groove 30 formed on the outer periphery of the foremost end portion of the shaft 24 through a washer 54, the stay base 10 and the stay 32 are completely connected to each other. The connected stay base 10 and stay 32 are covered with an opaque cover 58 made of plastic or the like material from below. The cover 58 is directly mounted on the ceiling of the vehicle. The cover 58 has an opening 60 in an end portion in the forward direction of the vehicle to allow the stay 32 to project out of the opening 60 of the cover 58.

Figure 1A:
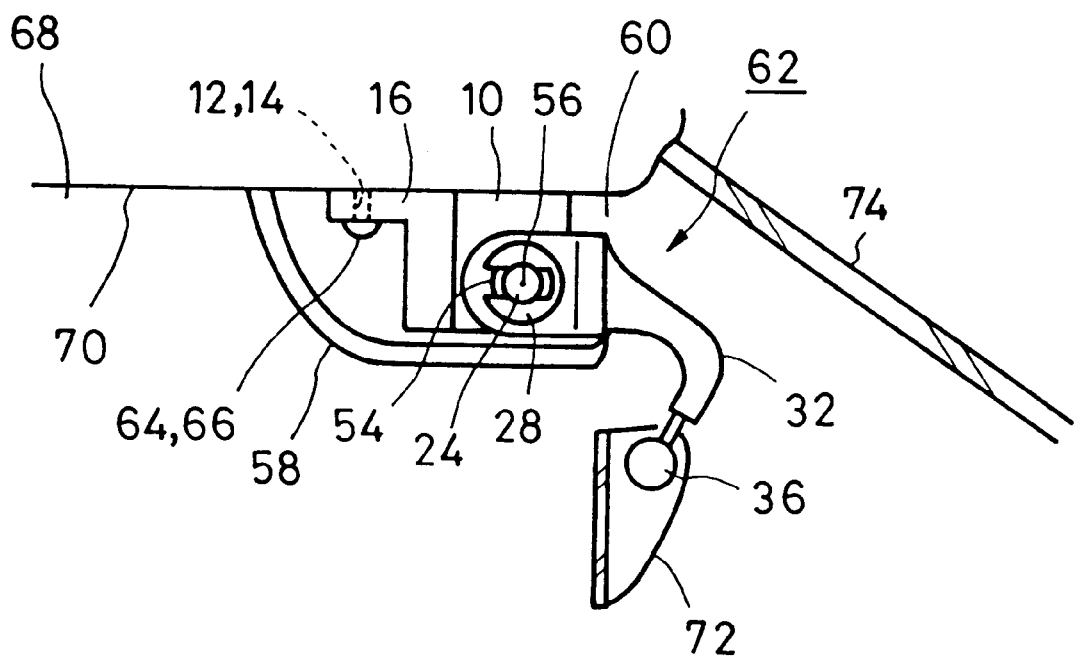
FIGS. 1A and 1B are side views of an escape device embodying the present invention showing an operation of an inner mirror having an escape structure shown in FIG. 2.

FIG. 1A shows the inner mirror 62 in its normal state of use. The stay base 10 is mounted on a ceiling 70 of a cabin 68 by inserting the screws 64 and 66 into the openings 12 and 14 of the ceiling mounting portion 16 and screwing the screws 12 and 14 into the ceiling 70. A mirror body 72 is mounted on the pivot 36 located at the lower end of the stay 32. In a normal state of use, the stay 32 is suspended from the stay base 10. In this state, the abutting surfaces 22 and 46 (FIG. 2) of the stay base 10 and the stay 32 are pressed to each other by energizing force of the coil spring 52 and corresponding ones of the depressions 50 and the projections 26 are held in a fitting state so that the stay 32 is securely supported by the stay base 10.

Figure 1B:
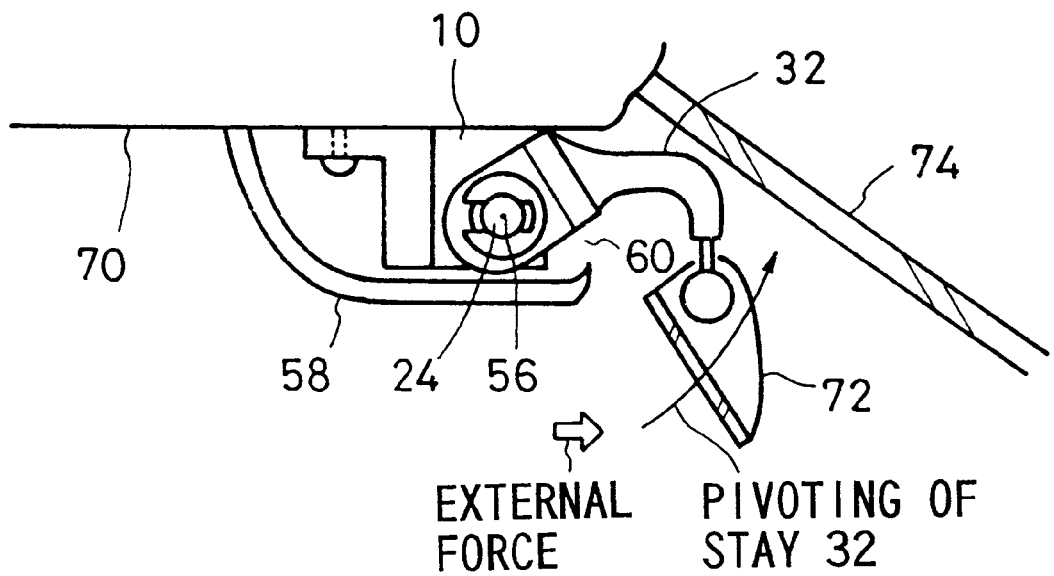

When a passenger collides against the mirror body 72 due to, e.g., collision of the vehicle and an external force thereby is applied to the stay 32 in the forward direction of the vehicle, the fitting engagement between the depressions 50 and the projections 26 is disengaged against the energizing force of the coil spring 52 and the stay 32 is thereby pivoted upwardly about the shaft 24 as shown in FIG. 1B to allow the external force to escape. The opening 60 of the cover 58 has a shape which does not prevent escaping of the inner mirror by the pivoting movement of the stay 32 (e.g., the stay 32 does not collide against the cover 58). The pivotal movement of the stay 32 stops before the stay 32 abuts against a front glass 74 by abutting engagement of a portion of the stay 32 with a stopper (not shown) formed in the stay base or other part. The state in which the stay 32 is pivoted upward is maintained by friction between the stay base 10 and the stay 32 caused by the energizing force of the coil spring 52 (e.g., by fitting engagement between the depressions 50 and the projections 26 other than the normal fitting engagement therebetween). By pulling the stay 32 toward the passenger from this state, the stay 32 is pivoted toward the passenger against the energizing force of the coil spring 52 and the fitting engagement between the depressions 50 and the projections 26 is restored to the state shown in FIG. 1A in which they are fitted in the normal fitting position.

Figure 3:
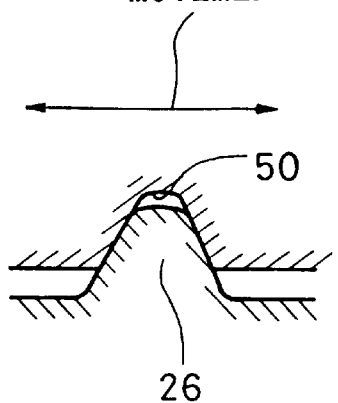
FIG. 3 is a view showing a cross section of depressions 26 and projections 50 in FIGS. 1A and 1B.

As shown in FIG. 3, surfaces of the projections 26 and the depressions 50 in the direction of relative pivotal movement therebetween may be formed in tapered surfaces so that fitting engagement and disengagement between the projections 26 and the depressions 50 will be made smoothly.

Figure 4:
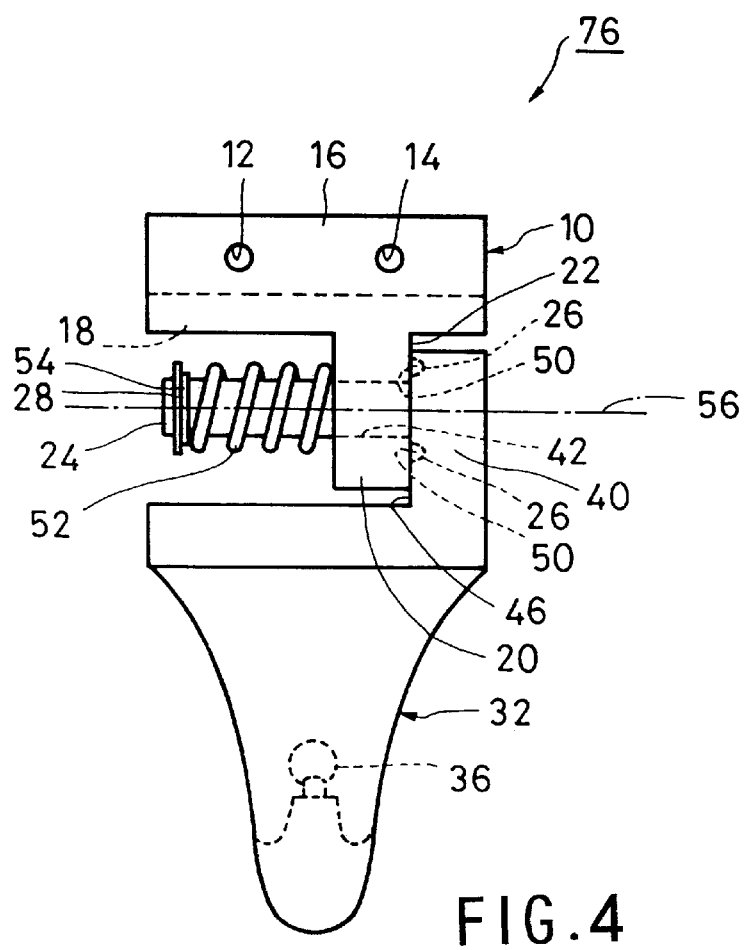
FIG. 4 is a plan view showing another embodiment of the invention.

In the above described embodiment, the shaft 24 is formed in the stay base 10 and the circular opening 42 is formed in the stay 32. Conversely, as shown in an inner mirror 76 of FIG. 4 in which the same component parts as those shown in FIG. 2 are designated by the same reference characters, the circular opening 42 may be formed in the stay base 10 and the shaft 24 may be formed in the stay 32 so that the stay 32 may be supported pivotably about the axis 56 and slidably in the direction of the axis 56. The shaft 24 is inserted in the coil spring 52 in a compressed manner and the coil spring 52 is secured by the plate 28 through the washer 54. The abutting surfaces 46 and 22 of the stay 32 and the stay base 10 are formed with the projections 26 and the depressions 50 and these projections 26 and the depressions 50 are in fitting engagement with each other by the energizing force of the coil spring 52 to hold the stay 32 in a suspended state in the normal mode of use in the same manner as in the state of FIG. 1A. When an external force acting in the forward direction of the vehicle is applied to the stay 32, the projections 26 and the depressions 50 are disengaged from each other and the stay 32 is pivoted upwardly about the shaft 56 to an escaping position in the same manner as in FIG. 1A to allow the external force to escape. By pulling the stay 32 toward the passenger from the upward escaping position, it can be restored to the state in the normal mode of use in the same manner as in FIG. 1A.

In the above described embodiments, the projections 26 are formed in the stay base 10 and the depressions 50 are formed in the stay 32. Conversely, the projections 26 may be formed in the stay 32 and the depressions 50 may be formed in the stay base 10.

What is claimed is:

1. An escape device for an inner mirror comprising:
   a stay base mounted on a ceiling of a cabin of a vehicle;
   a stay suspended from and supported by the stay base and connected to the stay base pivotably about an axis extending horizontally in the direction of width of the vehicle, said stay having a mirror body attached to a lower end portion thereof;

a stop mechanism provided between the stay base and the stay for stopping pivotal movement of the stay about the axis relative to the stay base and thereby holding said stay in a suspended state in a normal mode of use and, when an external force exceeding a predetermined value is applied to the stay in the forward direction of the vehicle, said stay is disengaged by said external force to allow the pivotal movement of the stay about said axis;

a fitting structure including projections and corresponding depressions provided in opposite portions of said stay base and said stay which move relative to each other by the pivotal movement of stay about said axis; and a spring provided between said stay base and said stay for energizing said stay base and said stay to hold said fitting structure in a fitting state;

the pivotal movement of said stay about said axis being stopped and said stay being held in said suspended state in a normal mode of use by holding said fitting structure in a fitting state and, when an external force exceeding a predetermined value is applied to the stay in the forward direction of the vehicle, the projections being disengaged from the depressions by the external force against the force of the spring to allow the pivotal movement of stay about said axis and thereby allow the external force to escape.

2. An escape device for an inner mirror as defined in claim 1 wherein one of the stay base or the stay has a shaft of a circular cross section and the other has an opening of a circular cross section and the shaft is inserted in the opening relatively rotatably and relatively slidably in the axial direction;

the fitting structure of the stop mechanism has the projections formed on an abutting surface of the stay base and the stay which are formed about an opening end portion of the opening and has the depressions formed on the other of the abutting surfaces; and the spring is a coil spring in which the shaft is inserted and which applies the energizing force between the stay base and the stay in the direction of the axis to press the abutting surfaces to each other and thereby hold the fitting state of the fitting structure.

3. An escape device for an inner mirror as defined in claim 1 wherein said stop mechanism can be restored, by applying an external force in the rearward direction of the vehicle, from the position in which said stop mechanism has disengaged from said stay to allow the pivotal movement to the position in which said stop mechanism stops pivotal movement of said stay.

4. An escape device for an inner mirror comprising:

a stay base mounted on a ceiling of a cabin of a vehicle;

a stay suspended from and supported by said stay base and connected to said stay base pivotably about an axis extending horizontally in the direction of width of the vehicle, said stay having a mirror body attached to a lower end portion thereof;

a stop mechanism provided between said stay base and said stay for stopping pivotal movement of said stay about said axis relative to said stay base and thereby holding said stay in a suspended state in a normal mode of use and, when an external force exceeding a predetermined value is applied to the stay in the forward direction of the vehicle, said stay is disengaged by the external force to allow the pivotal movement of the stay about said axis further comprising a cover which is mounted on said stay base in a manner to cover said stay base from below, said cover having an opening in an end portion in the forward direction of the vehicle to allow said stay to project out of the opening of the cover and said opening of said cover having a shape which does not prevent escape of said inner mirror by the pivoting movement of said stay.

* * * * *